United States Patent
Martin et al.

(10) Patent No.: US 6,177,372 B1
(45) Date of Patent: Jan. 23, 2001

(54) PREPARATION OF HIGH DENSITY HEAVY METAL FLUORIDE GLASSES WITH EXTENDED ULTRAVIOLET AND INFRA RED RANGES, AND SUCH HIGH DENSITY HEAVY METAL FLUORIDE GLASSES

(75) Inventors: Steven W. Martin; Jesse Huebsch, both of Ames, IA (US)

(73) Assignee: Iowa State University Research Foundation, Inc., Ames, IA (US)

( * ) Notice: Under 35 U.S.C. 154(b), the term of this patent shall be extended for 0 days.

(21) Appl. No.: 08/938,409

(22) Filed: Sep. 26, 1997

(51) Int. Cl.[7] ........................................ C03C 3/32
(52) U.S. Cl. ............................ 501/40; 501/904; 501/905
(58) Field of Search ........................ 501/40, 904, 905

(56) References Cited

U.S. PATENT DOCUMENTS

| | | | |
|---|---|---|---|
| 4,647,545 | * | 3/1987 | Lucas et al. ............ 501/40 |
| 4,717,691 | * | 1/1988 | Lucas et al. ............ 501/40 |
| 4,761,387 | * | 8/1988 | Tokida et al. ........... 501/40 |
| 5,480,845 | * | 1/1996 | Maze et al. ............. 501/40 |
| 5,856,882 | * | 1/1999 | Yanagati et al. ........ 501/40 |

FOREIGN PATENT DOCUMENTS

| | | | |
|---|---|---|---|
| 282 155 | * | 9/1988 | (EP) . |
| 60-155549 | * | 8/1985 | (JP) . |
| 7-187708 | * | 7/1995 | (JP) . |
| 8-169725 | * | 7/1996 | (JP) . |

* cited by examiner

Primary Examiner—Mark L. Bell
Assistant Examiner—David Sample
(74) Attorney, Agent, or Firm—Henderson & Sturm LLP

(57) ABSTRACT

A heavy metal fluoride glass composition range (in mol percent) consisting essentially of: $(16-30)BaF_2.(8-26)HfF_4.(6-24)InF_3$ or $GaF_3.(4-16)CdF_2.(6-24)YbF_3.(4-22)ZnF_2$. In an alternative embodiment, a heavy metal fluoride glass composition range (in mol percent) comprises $(16-30)BaF_2.(8-26)HfF_4.(6-24)$ of $(0-24)InF_3$, $(0-24)GaF_3$ and $(0-19)AlF_3.(1-16)CdF_2.(6-24)YbF_3.(4-26)ZnF_2$. A preferred heavy metal fluoride glass produced in accordance with the present invention comprises a composition (in mol %) and comprises about $26BaF_2.18HfF_4.7InF_3.5GaF_3.10CdF_2.18YbF_3.16ZnF_2$. A preferred heavy metal fluoride glass has maximum thickness of most preferably about 3 mm. Another preferred heavy metal fluoride glass comprises a composition (in mol %) and comprises about $26BaF_2.18HfF_4.12AlF_3.10CdF_2.18YbF_3.16ZnF_2$.

10 Claims, 11 Drawing Sheets

PREPARATION OF HIGH DENSITY HEAVY METAL FLUORIDE GLASSES WITH EXTENDED ULTRAVIOLET AND INFRA RED RANGES, AND SUCH HIGH DENSITY HEAVY METAL FLUORIDE GLASSES

GOVERNMENT SUPPORT

This invention was made with government support under Grant No. NGT-40018 awarded by NASA. The U.S. Government has certain rights in the invention. The rights of the U.S. Government are acknowledged to the extent confirmed thereon in view of the funding of this application by NASA under Grant No. NGT-40018.

TECHNICAL FIELD

The present invention relates to the field of high-density glasses. In particular, the present invention is directed to heavy metal fluoride glasses (HMFG), processes for the production of such heavy metal fluoride glasses, and apparatus embodying such heavy metal fluoride glasses.

More specifically, the present invention is directed to heavy metal fluoride glasses with extended ultraviolet (UV) and infrared (IR) transmission ranges, methods of producing heavy metal fluoride glasses with extended ultraviolet (UV) and infrared (IR) transmission ranges, and apparatus embodying heavy metal fluoride glasses with extended ultraviolet (UV) and infrared (IR) transmission ranges.

BACKGROUND ART

A number of glasses having high density and exhibiting a wide transmission window in the ultraviolet range are generally known. The high density and wide transmission window in the ultraviolet range allow high stopping power and high Cerenkov light yield. Consequently, such glasses are good materials for applications requiring either fast time measurements, or energy measurements at high energy.

The following are examples of patents directed to glasses and technology related to the present invention: U.S. Pat. No. 4,717,691, Lucas et al.; U.S. Pat. No. 4,749,666; U.S. Pat. No. 5,015,281, Hall et al.; U.S. Pat. No. 5,081,076, Rapp; EP 0 234 581, Minoru et al.; EP 0 282 155, Franz et al.; and GB 2,082,168, Lucas et al.

Fluoride glasses have good optical transparency both in the infrared and ultraviolet regions of the electromagnetic spectrum. In this field, new high density fluoride glasses were developed and characterized in terms of density, ultraviolet (UV)/visible/infrared (IR) transmission, chemical stability, and glass transition/crystallization temperatures. The family of glasses found in this field have a very high density, are free of any lead or radioactive elements, and are accompanied by a low UV cut-off as well as extended transmission into the mid-IR range.

Fluoride glasses were first discovered in 1974 by Michael and Marcel Poulain, who were working with Jacque Lucas at the University of Rennes in France. These glasses were found to have good optical transparency in the UV and visible ranges. High density fluoride glasses are of particular interest because they tend to have a low UV cut-off as well as extended transmission into the mid-IR range. Possible uses for these glasses are: Cerenkov detectors, scintillation hosts, x-ray detectors, optical amplifiers, and if stable enough, laser fibers.

Other high density glasses have been reported, including a family of glasses in the $BaF_2$—$YbF_3$—$ThF_4$—$ZnF_2$ system with a reported density of 6.43 g/cc. The problem with glasses in this system is that they are relatively unstable against devitrification. Samples have been cast up to a maximum thickness of approximately 3 mm, but this system contains thorium which exhibits radioactive decay. Thorium based glasses do, however, have better chemical stability and extended IR transmission compared to traditional fluorozirconate glasses.

Another high density glass family, 6.0 g/cc, was discovered by Tick in the $CdF_2$—$LiF$—$AlF_3$—$PbF_2$ quaternary system, but these glasses can only be made up to a maximum thickness of 2 mm. This system also contains lead, which has been shown to have quenching affects for scintillation mechanisms in fluoride glasses.

Zhou, et al. reported glass formation in the $PbF_2$—$BaF_2$—$HfF_4$—$ZnF_2$—$YbF_3$ system having a density range of 6.0–6.9 g/cc, a maximum thickness of 3 mm, and a UV cut-off of 254 nm. However, these glasses were found to be very susceptible to attach by moisture as they exhibited a thick reaction layer after being immersed in water for a period of only one hour. This would make the glasses unsuitable for uses in an ambient atmosphere.

In his work, Zhou was originally trying to synthesize glasses the $BaF_2$—$YbF_3$—$ZnF_2$—$HfF_4$ system by substituting Hf in place of the Th found in the $BaF_2$—$YbF_3$—$ZnF_2$—$ThF_4$ system described above. However, these direct substitutions were not glass forming compositions so he varied the molar ratios of the four elements until he found some areas of glass formation. He later added lead in place of some of the barium and zinc in an effort to increase the glass forming character.

In the fall of 1995, several companies expressed interest in the lead free glass compositions reported by Zhou. This led to an effort, through the Iowa State University Research Foundation (ISURF) to reproduce some of these glasses. Attempts at reproducing his work failed as the compositions were found to have a severe tendency to crystallize at a thickness as small as 1 mm. It was later found that Zhou had used porcelain crucibles to melt some of his compositions. It is assumed that the alumina and silica oxides from the crucibles aided in glass formation, and may have actually produced an oxy-fluoride glass, as fluoride will readily attack any oxides present at elevated temperatures. During attempts reported herein to reproduce his work, platinum crucible, known not to contaminate fluoride glasses, were used.

Even though the lead free compositions were not good glass formers, there was evidence that maybe some of the compositions could be modified and/or stabilized to produce a family of good glass forming compositions. This evidence came from the fact that when a melt was quenched between two plates at room temperature, rather than at an elevated casting temperature, thin sheets of glass were formed.

The purpose of the present invention is not only to find a high density glass free of lead and radioactive elements, but also to find a stronger glass forming system since most applications would require a glass with a thickness greater than 3 mm.

SUMMARY OF THE INVENTION

The present invention relates to heavy metal fluoride glasses which have been discovered to exhibit extended transmission into ultra-violet (UV) and infra-red (IR) ranges.

In this regard, the present invention is also directed to heavy metal fluoride glasses, such as $HfF_4$-based heavy metal glasses having extended UV and IR transmission ranges.

The glass forming region found in this work is: (16–30)$BaF_2$.(8–26)$HfF_4$.(0–16)$CdF_2$.(6–24)$YbF_3$.(4–26)$ZnF_2$.(6–24)$AlF_3$ or $GaF_3$ or $IfF_3$. These glasses have a density range of 5.8–6.0 g/cc, a UV cut-off of 260 nm, and had an IR cut-off of 9–10 μm, depending on the specific composition.

The heavy metal fluoride glasses of the present invention comprise a composition range (in mol percent) selected from the group consisting of:

(16–30)$BaF_2$.(8–26)$HfF_4$.(6–24)$InF_3$ or $GaF_3$.(4–16)$CdF_2$.(6–24)$YbF_3$.(4–22)$ZnF_2$; and (16–30)$BaF_2$.(8–26)$HfF_4$.(6–24)$InF_3$ or $GaF_3$ or $AlF_3$.(0–16)$CdF_2$.(6–24)$YbF_3$.(4–26)$ZnF_2$.

A more preferred heavy metal fluoride glass produced in accordance with the present invention comprises a composition (in mol %) comprising about:

$$26BaF_2.18HfF_4.7InF_3.5GaF_3.10CdF_2.18YbF_3.16ZnF_2 \quad (I)$$

A more preferred heavy metal fluoride glass produced in accordance with the present invention have a maximum thickness of most preferably about 3 mm.

Another more preferred heavy metal fluoride glass produced in accordance with the present invention comprises a composition (in mol %) comprising about:

$$26BaF_2.18HfF_4.12AlF_3.10CdF_2.18YbF_3.16ZnF_2 \quad (II)$$

A more preferred heavy metal fluoride glass produced in accordance with the present invention have a maximum thickness of most preferably greater than about 6 mm.

The heavy metal fluoride glasses produced in accordance with the present invention exhibit the following characteristics:

| CHARACTERISTICS | (II) MORE PREFERRED VALUES | (I) PREFERRED VALUES |
|---|---|---|
| Glass Transition Tg | 338° C. | 326° C. @ heating rate of 5° C./min |
| Onset of Crystallization Tx | 421° C. | 370° C. |
| Peak of Crystallization Tc | 440° C. | 399° C. |
| Bulk Density (Archimedes) | 5.8g/cc | 6.0g/cc |
| Ultra-violet cut-off | ~268nm | ~260nm |
| Infrared cut-off | ~9μm | ~10μm |

The high density fluoride glasses in accordance with the present invention also exhibit transmission characteristics that transmit light in the ultra-violet range.

The heavy metal fluoride glasses in accordance with the present invention also have a high density.

The high density fluoride glasses in accordance with the present invention may also have a high index of refraction.

Although not wishing to be bound by any particular theory, it is believed that high density fluoride glasses having extended UV and IR transmission ranges are produced in accordance with the present invention and preferably are substantially or essentially devoid of at least one member selected from the group consisting of thorium, radioactive thorium, and lead. The previously mentioned discoveries of the present invention are believed notwithstanding that the fluoride glasses may have a density greater than about 6.0 g/cm³.

In accordance with the present invention, high density fluoride glasses with extended transmission into the UV and IR ranges preferably comprise a density greater than about 6.0 g/cm³ which preferably are substantially or essentially devoid of at least one member selected from the group consisting of thorium, radioactive thorium, and lead.

For purposes of the present invention, the starting materials, also referred to herein as raw materials, for such heavy metal fluoride glasses are compounds of metals that are capable of being converted into fluorides. Preferably, such starting materials for such heavy metal fluoride glasses are materials selected from the group consisting of oxides, hydroxides, fluorides, and carbonates, and most preferably oxides that are capable of being converted into such fluorides.

In accordance with the process for the production of such heavy metal fluoride glasses, the starting materials identified above are first converted to fluorides prior to melting a resultant fluoride mixture at predetermined temperatures for prescribed time periods, quenching the melt, and then annealing the resultant glass at a temperature below the glass transition temperature of the glass.

In accordance with the present invention, it has been noted that emitted flux of these glasses when used a Cerenkov detector scales as the inverse square of wavelength, $1/\lambda^2$.

The heavy metal fluoride glasses of the present invention have been discovered to be useful and advantageous over conventional glasses generally in being denser, exhibit more UV transmission/transparency, in addition to being more chemically stable and durable, more easily produced, and having stronger glass forming abilities and/or capabilities.

The high density of the fluoride glasses in accordance with the present invention advantageously results in higher stopping power for electromagnetic particles, particularly when the high density fluoride glasses are used in detectors, such as Cerenkov detectors.

The light transmission characteristics of the fluoride glasses used in accordance with the present invention are advantageous in increasing flux of detectable light, and particularly increasing the flux of detectable Cerenkov light.

Although not wishing to be bound by any particular theory, the heavy metal fluoride glasses of the present invention are believed to be advantageous, partially in comparison to the prior art, because the heavy metal fluoride glasses of the present invention preferably are substantially or essentially devoid of at least one member selected from the group consisting of thorium, radioactive thorium, and lead in addition to being essentially devoid of manganese.

The heavy metal fluoride glasses of the present invention are also essentially devoid of manganese because it is believed to be a very undesirable component of glass.

The present invention is also directed to apparatus for measurement of time, apparatus for measurement of energy, Cerenkov radiators, and Cerenkov detectors that include heavy metal fluoride glasses of the present invention, in addition to laser fibers, scintillating glasses, optical amplifiers, and imaging equipment, particularly medical imaging that include heavy metal fluoride glasses of the present invention.

DETAILED DESCRIPTION

Figure 1:
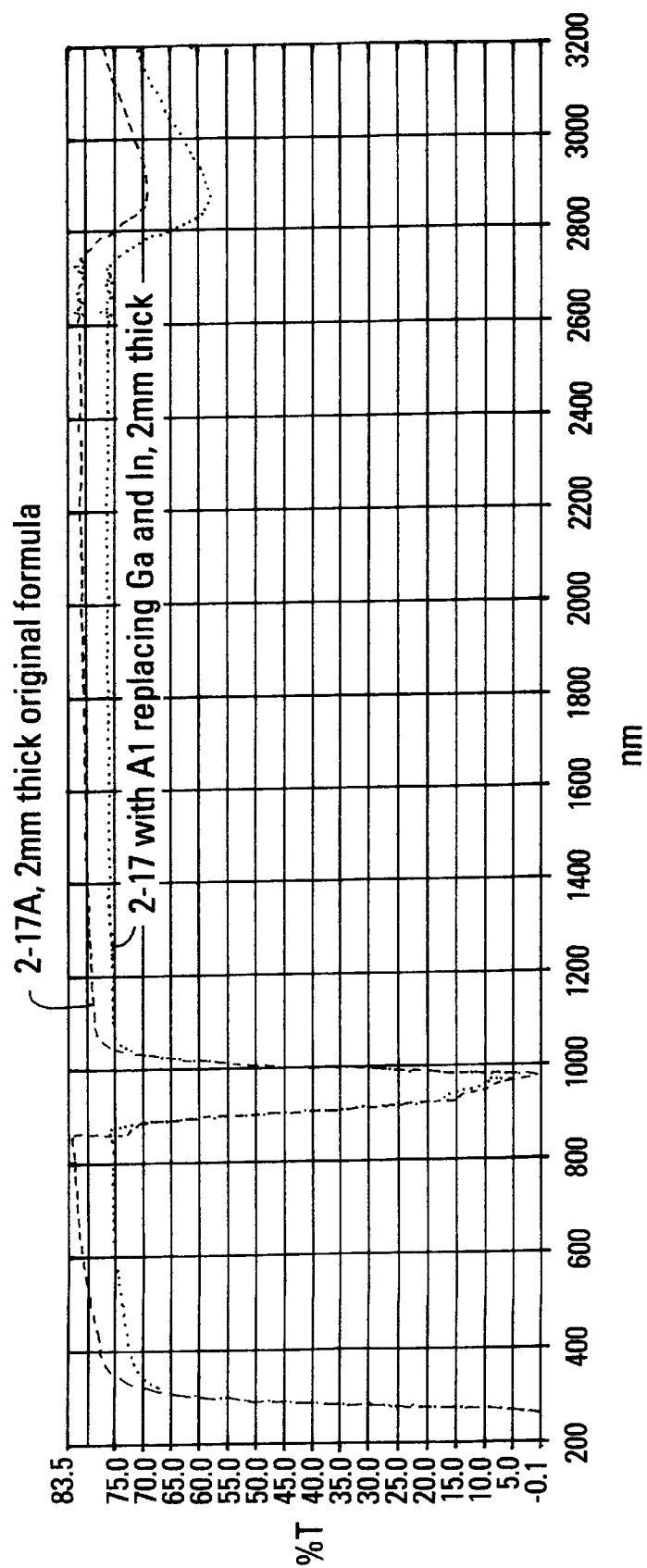
FIGS. 1 and 1B–1F depict graphs showing comparison data.
Figure 1B:
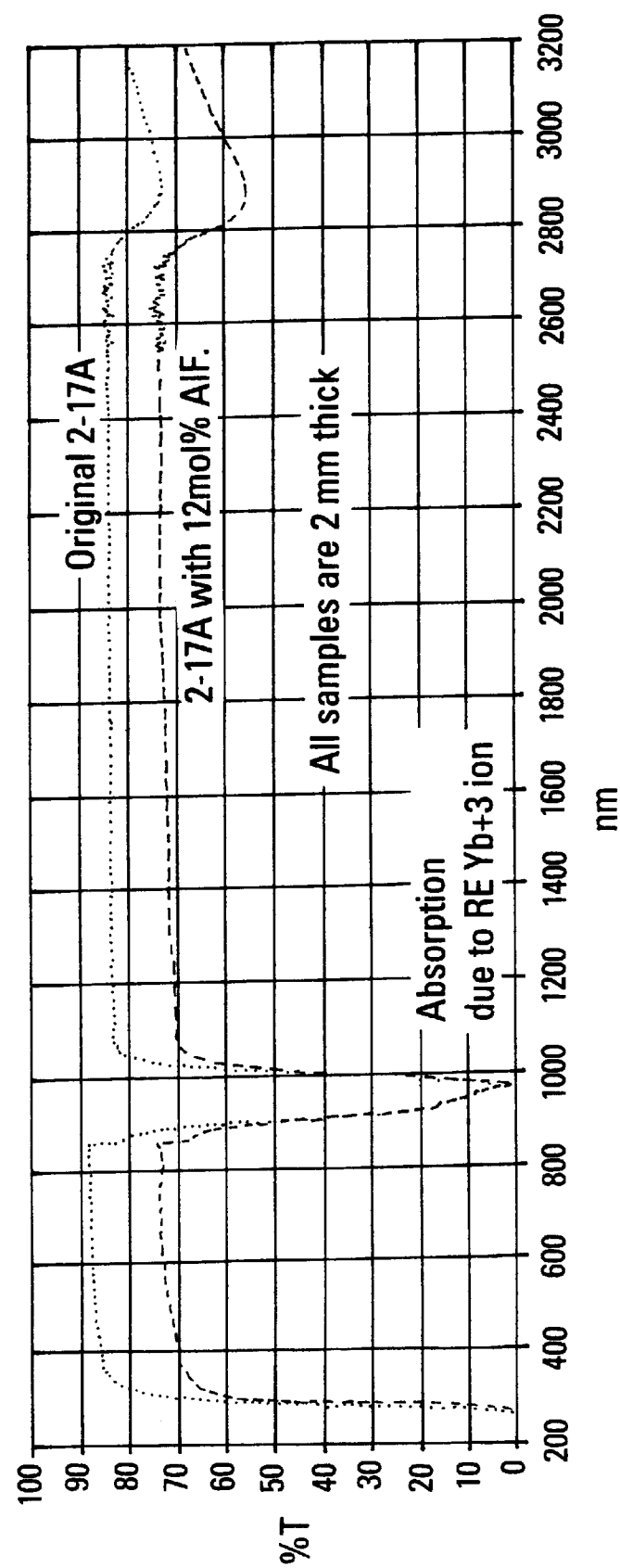
Figure 1C:
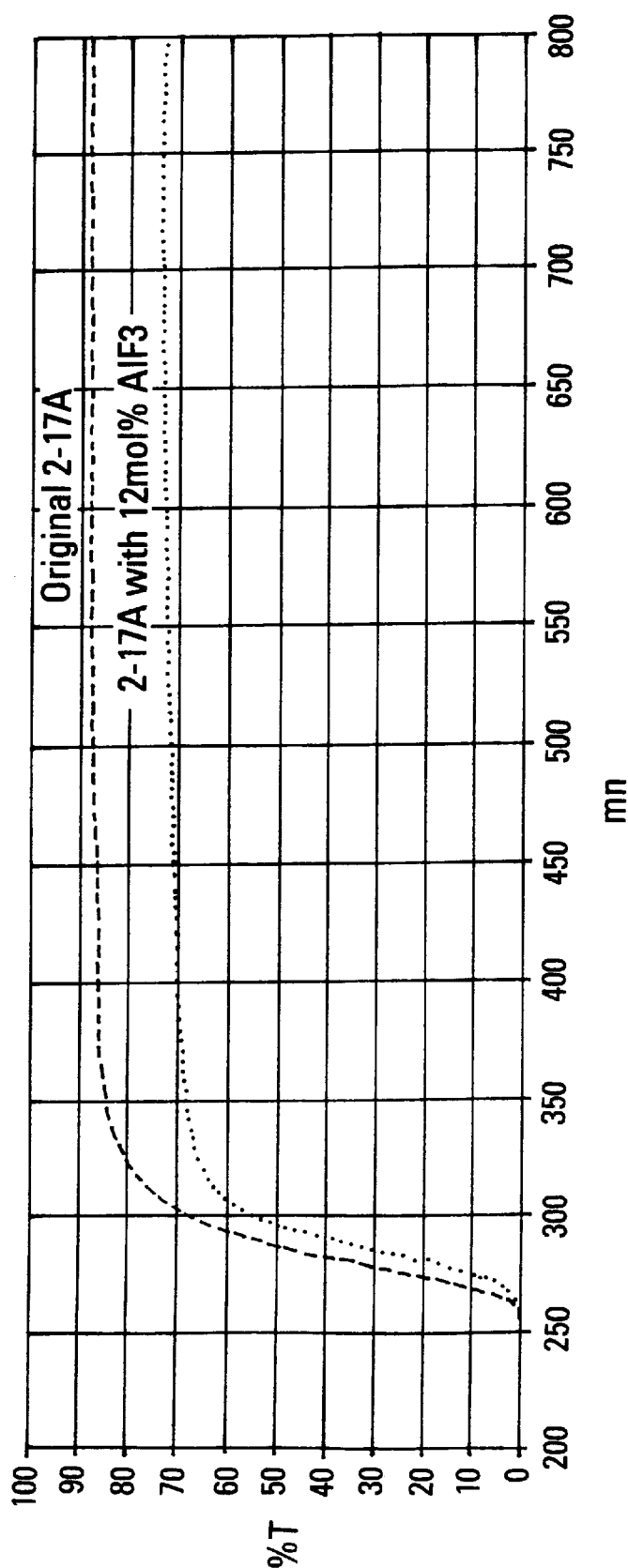
Figure 1D:
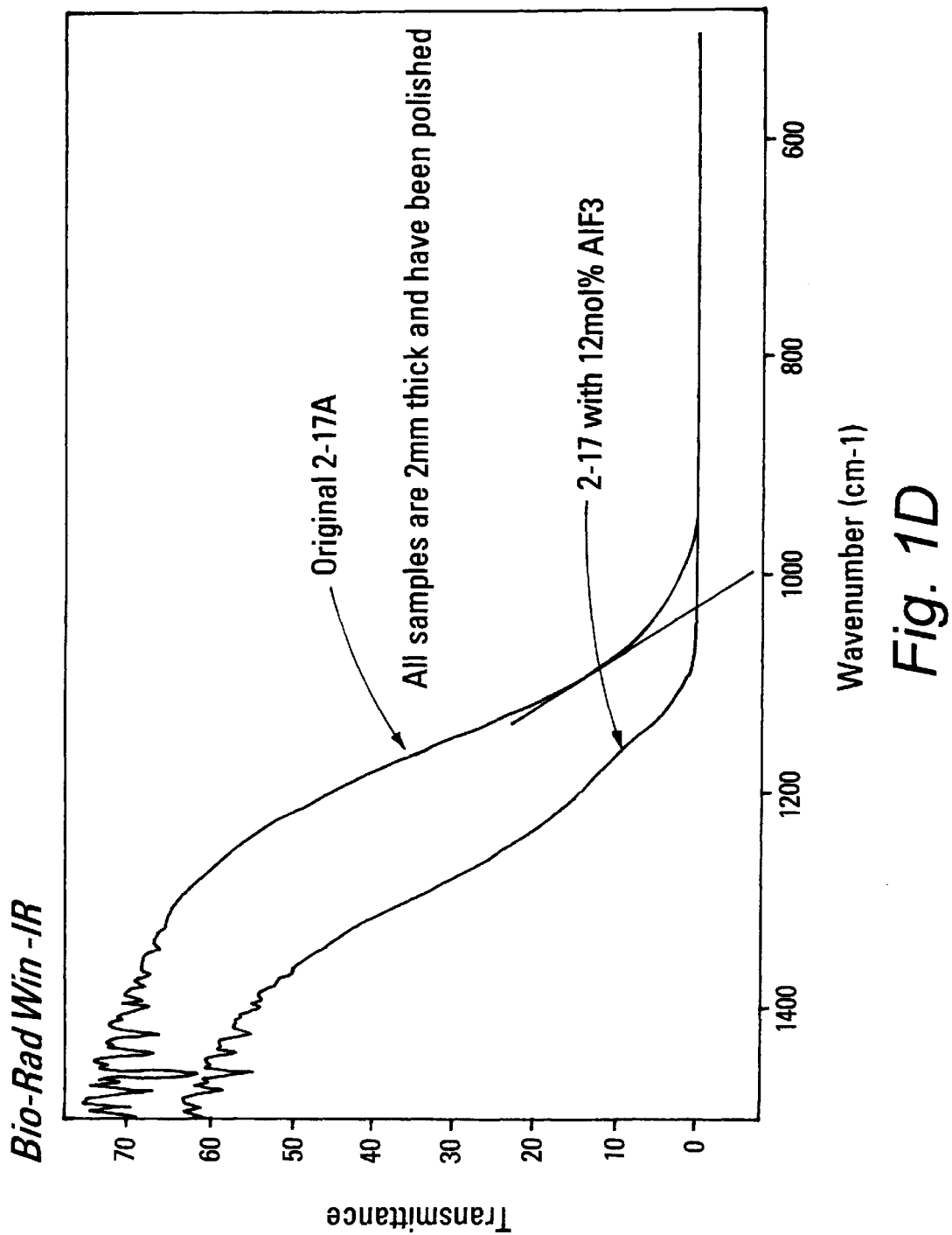

The following is a detailed description of the present invention that is intended to be claimed.

In general, the present invention relates to heavy metal fluoride glasses, methods or processes for preparing heavy metal fluoride glasses, uses of high density glasses, and apparatus embodying heavy metal fluoride glasses wherein the heavy metal fluoride glass comprises a composition range (in mol percent) of:

(16–30)$BaF_2$.(8–26)$HfF_4$.(6–24)$InF_3$/$GaF_3$.(4–16)$CdF_2$.(6–24)$YbF_3$.(4–22)$ZnF_2$; and (16–30)$BaF_2$.(8–26)$HfF_4$.(6–24)$InF_3$/$GaF_3$/$AlF_3$.(0–16)$CdF_2$.(6–24)$YbF_3$.(4–26)$ZnF_2$.

High density glasses produced in accordance with the present invention most preferably comprise a composition (in mol %) comprising about:

26$BaF_2$.18$HfF_4$.7$InF_3$.5$GaF_3$.10$CdF_2$.18$YbF_3$.16$ZnF_2$ (I)

Another more preferred high density glasses produced in accordance with the present invention comprises a composition (in mol %) comprising about:

26$BaF_2$.18$HfF_4$.12$AlF_3$.10$CdF_2$.18$YbF_3$.16$ZnF_2$ (II)

The high density glasses produced in accordance with the present invention exhibit the following characteristics:

| CHARACTERISTICS | (II) MORE PREFERRED VALUES | (I) PREFERRED VALUES |
|---|---|---|
| Glass Transition Tg | 338° C. | 326° C. @ heating rate of 5° C./min |
| Onset of Crystallization Tx | 421° C. | 370° C. |
| Peak of Crystallization Tc | 440° C. | 399° C. |
| Bulk Density (Archimedes) | 5.8g/cc | 6.0g/cc |
| Ultra-violet cut-off | ~268nm | ~260nm |
| Infrared cut-off | ~9μm | ~10μm |

Turning first to the methods or processes for producing heavy metal fluoride glasses in accordance with the present invention, the method or process for producing heavy metal fluoride glasses in accordance with the present invention involves initially converting the starting materials, also referred to as raw materials, into fluorides. In this regard, the starting materials may be separately or in a mixture converted into such fluorides.

Alternative methods which have been discovered to be suitable for converting the starting materials into fluorides include:

(i) reaction of raw materials, e.g. metal oxides, hydroxides, carbonates, or any other metal salts which can be converted into fluorides, with a solid fluorinating agent, such as $NH_4HF_2$; and, (ii) reaction of the raw materials with a gaseous fluorinating agent, such as HF, $F_2$ or other fluorine-containing gases.

For the purposes of the present invention, the suitable starting materials comprise at least one member selected from the group consisting of oxides, hydroxides, fluorides, carbonates or oxyfluorides of Hf, Ba, In, Ga, and Cd. Preferably, the starting materials are fluorides of the said materials. As used herein, the abbreviations, such as Hf, Ba, In, Ga, and Cd, are the accepted IUPAC abbreviations for the elements, such as Hafnium, Barium, Indium, Gallium, and Cadmium, respectively.

For purposes of the present invention, a fluorinating agent preferably should be used even if all the starting materials are fluorides. Although not wishing to be bound by any particular theory, it is believed that this use of a fluorinating agent converts the raw materials, such as oxides, hydroxides, oxy-fluorides, and the like, into fluorides in a reaction as follows:

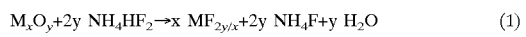
$M_xO_y + 2y\ NH_4HF_2 \rightarrow x\ MF_{2y/x} + 2y\ NH_4F + y\ H_2O$ (1)

$M(OH)_z + z\ NH_4HF_2 \rightarrow MF_z + z\ NH_4F + z\ H_2O$ (2)

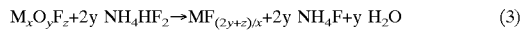
$M_xO_yF_z + 2y\ NH_4HF_2 \rightarrow MF_{(2y+z)/x} + 2y\ NH_4F + y\ H_2O$ (3)

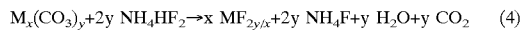
$M_x(CO_3)_y + 2y\ NH_4HF_2 \rightarrow x\ MF_{2y/x} + 2y\ NH_4F + y\ H_2O + y\ CO_2$ (4)

where M is Hf, Yb, Zn, Pb, or Ba; x=1 or 2; y=1, 2 or 3; and z=1, 2, 3 or 4.

This use of a fluorinating agent is also believed to ensure that oxides and other impurities, if any, are also converted into fluorides in reaction as shown in Eq. (1) through Eq. (4), here rewritten as Eq. (5) through Eq. (8):

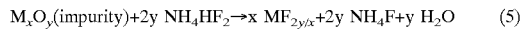
$M_xO_y(impurity) + 2y\ NH_4HF_2 \rightarrow x\ MF_{2y/x} + 2y\ NH_4F + y\ H_2O$ (5)

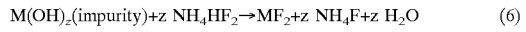
$M(OH)_z(impurity) + z\ NH_4HF_2 \rightarrow MF_z + z\ NH_4F + z\ H_2O$ (6)

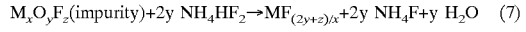
$M_xO_yF_z(impurity) + 2y\ NH_4HF_2 \rightarrow MF_{(2y+z)/x} + 2y\ NH_4F + y\ H_2O$ (7)

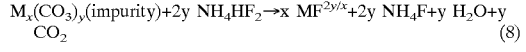
$M_x(CO_3)_y(impurity) + 2y\ NH_4HF_2 \rightarrow x\ MF^{2y/x} + 2y\ NH_4F + y\ H_2O + y\ CO_2$ (8)

where, as above in Eq. (1–4), M is Hf, Yb, Zn, Pb, or Ba; x=1 or 2; y=1, 2 or 3; and z=1, 2, 3 or 4.

Accordingly, the fluorides themselves are prevented from being oxidized during the process.

Most preferably for purposes of the present invention, the starting materials are fluorinated by using $NH_4HF_2$ as the fluorinating agent. However, suitable fluorinating agents may be selected from the group consisting of HF, $F_2$, and $SF_6$.

In accordance with the present invention, the starting materials, such as the above-identified oxides, are first mixed together with an excess amount of a solid fluorinating agent, most preferably $NH_4HF_2$. In accordance with the present invention, it has been discovered that the ratio of starting materials to fluorinating agents varies inversely to the fluoride content of the starting materials.

More specifically, excess $NH_4HF_2$ amounts to about 20 wt % of the total weight of the starting fluorides. Although not wishing to be bound by any particular theory, the fluorinating agents are believed to function here to remove impurities, such as impurities selected from the group consisting of oxide impurities and water impurities from starting fluorides.

Appropriate amounts of oxides are weighted out and ground preferably in a mortar and pestle, with excess $NH_4HF_2$ (fluorinating agent), which may be approximately double the starting weight of the oxides.

Appropriate amounts of starting fluorides were weighed out and combined with excess $NH_4HF_2$ equal to twenty weight percent of the total weight of the starting fluorides. The purpose of the fluorinating agent here is to remove any oxide or water impurities from the starting fluorides.

Most preferably the synthesized fluorides are added to the starting fluorides and excess reagent mixture and ground thoroughly.

The resultant mixture is then placed into a crucible which has been previously rinsed out with water and dried with high pressure air to ensure that all traces of water are removed and heated at a predetermined temperature for a prescribed period of time. Most preferably the oxides are then placed in a platinum crucible and fluorinated at about 400° C. for about three hours in an electric tube furnace. The temperature and time for purposes of this step of the process of the present invention is at least in part dependent upon the batch amount and the specific starting materials used.

The mixture is then placed in the crucible and the excess fluorinating agent is burned off preferably at about 600° C. for between about 1–1.5 hours.

Although a crucible is the most preferred form of a vessel in which the mixture is heated at this stage of the process, other suitable vessels may be used. In any event, for purposes of the present invention, the crucible or other suitable vessel should be composed of a material selected from the group consisting of vitreous carbon and noble metal, or other chemicals stable in the presence of high temperature fluorides and oxy-fluorides. For purposes of the present invention, noble metals selected from the group consisting of gold, platinum and platinum-rhodium are preferred, with gold and platinum more preferred, and with platinum most preferred.

The heated mixture is then subjected to additional heating at higher temperatures for a time sufficient to melt the heated mixture to result in a melt molten liquid.

For purposes of the present invention, it is preferred to effect melting in an inert atmosphere. In this regard, the inert atmosphere is provided by an inert gas more preferably selected from the group consisting of argon and nitrogen, with nitrogen being most preferred.

Most preferably, a lid is then placed on top of the crucible and the furnace temperature is increased up to about 900° C. and the mixture is heated for about thirty minutes. Although not wishing to be bound by any particular theory, the purpose of the lid is believed to create somewhat of a protective atmosphere for the melt by keeping the fluorinating agent from leaving the crucible to quickly as the last traces of it burned off.

The melt or melted mixture may then be quenched, for example by pouring the melt into a preheated mold in which it is quenched to form a glass bulk.

Most preferably, the crucible is then removed from the furnace and kept hot using an appropriate burner, such as a Bunsen burner. This step is believed to be necessary to keep the top of the crucible hot in order to avoid crystallizing the glass as it is poured. The melt is then quickly poured into a preheated brass mold at a temperature most preferably at about 270° C. to cast the melt as glass discs typically 3 cm in diameter and up to 6 mm in thickness. The mold is then shut off and allowed to cool naturally.

For purposes of the present invention, it is important that the mold be stable at the pouring temperature and have sufficient capability for quenching. Thus, for purposes of the present invention, any conventional mold that is stable at the pouring temperature and has sufficient quenching ability is suitable. The materials suitable for making the mold are preferably selected from a group consisting of graphite, ceramics, and metals. Preferably, the metal suitable for the quenching mold comprises at least one material selected from the group consisting of carbon steel, superalloy, brass, and stainless steel; with brass and/or stainless steel being preferred, and brass being most preferred. Related to this, superalloys selected from the group consisting of Ni-based superalloys, Fe-based superalloys, and Co-based superalloys are suitable for use in the manufacture of the mold.

Finally, the quenched melt or bulk glass is subjected to annealing at a predetermined temperature for a prescribed period of time effective to anneal the glass. The annealing temperature is dependent upon the glass transition temperature of the specific glass. In this regard, the glass is preferably subjected to temperatures below the glass transition temperature of the glass during annealing. Preferably the glass is subjected to temperatures within the range of about 250° C. to about 325° C. for a period of time within the range of about two hours to about 10 hours. Most preferably, the cast glass disks are then annealed at 305° C. in a box furnace for 16 hours before being polished.

The raw materials used in this project are shown below in Table 1. Fluorination of oxides was accomplished using the much described ammonium bifluroide, $NH_4HF_2$ method. The appropriate stoichiometric amount of fluorinating agent was determined and then 50 mol % excess as added to ensure complete fluorination. First, the ammonium bifluoride was ground with a porcelain mortar and pestle into a very fine powder. The starting fluorides and oxides were then mixed in thoroughly with the ammonium bifluoride powder.

TABLE 1

Starting materials with their purity and source.

| Material | Purity (%) | Manufacturer |
| --- | --- | --- |
| $Al_2O_3$ | 99.99 | Fisher Scientific |
| $HfO_2$ | 99.95 | Cerac |
| $YbF_3$ | 99.9 | Cerac |
| $BaF_2$ | 99.9 | Cerac |
| $CdF_2$ | 99.9 | Cerac |
| ZnO | 99.999 | Gallard Schlesinger |
| $In_2O_3$ | 99.999 | Cerac |
| $Ga_2O_3$ | 99.999 | Gallard Schlesinger |

This mixture was then placed in a 90 Pt/10 Ir crucible and inserted in a tube furnace. The temperature of the furnace was raised to 300° C. for 2–6 hours, depending on the initial size of the batch, to allow the conversion of oxides to fluorides. The furnace temperature was then raised to 600° C. to allow any excess fluorinating agent to burn off.

After all of the excess fluorinating reagent was removed, the crucible was taken out of the furnace and allowed to cool. The resulting fluoride powder was then finely ground with a mortar and pestle. After grinding, the powder was placed back in the crucible and inserted into the furnace which was still operating at a temperature of 600° C. A lid was placed on top of the crucible and the temperature of the furnace was raised to 900° C. for thirty minutes to melt the entire sample and allow for fining of the melt to take place.

In the ammonium bifluoride process, the continuous flow of $NH_4HF_2$ protects the melt from atmosphere hydrolysis, which occurs for only a few minutes when the glass is first melted. If a deep crucible is used, hydrolysis does not hinder glass formation. A deep crucible design allows the glasses to be made in an ambient atmosphere. The crucible used in this project had a test tube design with an outer diameter of 21 mm, and a wall thickness of 0.5 mm. The overall length of the crucible was 120 mm.

The melt was removed from the furnace and allowed to cool slightly before being poured into a pre-heated brass mold. The mold was allowed to cool naturally down to room temperature, and the resulting glass disk was placed in a muffle furnace. The temperature of the furnace was ramped at a rate of 3° C./min up to a temperature about 15–20° C. below the glass transition temperature, in order to anneal the glass. The annealing time ranged from 16 hours, for samples 2 mm thick, to 36 hours for samples 6 mm thick. The glass disks were polished for three minutes per side for each or a range of polishing papers.

The glass transition temperatures (Tg) were determined using a Seiko TG/DTA 3020 scanned at a rate of 10° C./min. The UV/visible transmission spectra were measured using a UV/VIS/NIR Perkin-Elmer Lambda 19 Spectrometer. The IR transmission spectra was found using a Bio-Rad Digilab FTS 40 Spectrometer. Bulk densities of the glasses were found by the Archimedes method using distilled water.

TABLE 2

Optimum compositions of the fluorides glasses in mol % of the present invention.

| Sample | HfO$_2$ | BaF$_2$ | YbF$_3$ | InF$_3$ | GaF$_3$ | ZnF$_2$ | CdF$_2$ | AlF$_3$ |
|---|---|---|---|---|---|---|---|---|
| I | 18 | 26 | 18 | 7 | 5 | 16 | 10 | — |
| II | 18 | 26 | — | — | 16 | 10 | 12 | |

Table 2, shown above, gives compositions for two of the best glass forming samples found in this work. Sample II was made by simply substituting 12 mol % AlF$_3$ for the InF$_3$ and GaF$_3$ found in Sample I. As expected, the addition of AlF$_3$ improved glass forming ability, lowered the density, raised the Tg, and lowered the IR cut-off of the glass. The general properties of these glasses are shown below in Table 3.

TABLE 3

General properties of the fluoride glasses.

| Sample | ρ (g/cc) | Tg | max. thick (mm) | IR cut-off (μm) | UV cut-off (nm) |
|---|---|---|---|---|---|
| I | 6.0 | 326 | 3 | 10 | 260 |
| II | 5.8 | 338 | >6 | 9 | 260 |

The Group IIA elements, Al in particular, are considered to often act as stablizers in fluoride glasses. GaF$_3$ and InF$_3$, which are both heavier and have a much higher density than AlF$_3$, were tried first in small amounts to stabilize the glass. Samples using only GaF$_3$ or InF$_3$ were not glass forming compositions. In addition, combinations of AlF$_3$ and GaF$_3$/InF$_3$ were not glass forming. Larger amounts of the Group IIIA elements would most likely increase the stability of the glass, but this would also dramatically lower the density of the glass, as evidenced by the increased thickness and lower density of Sample II. Table 4 below shows the known densities of the crystalline fluorides, as well as ionic radii of the respective cations.

TABLE 4

Densities and ionic radius of crystalline fluorides.

| Material | crystalline density (g/cc) | cation charge | ionic radius (nm) |
|---|---|---|---|
| AlF$_3$ | 2.88 | Al$^{+3}$ | 0.057 |
| InF$_3$ | 4.39 | In$^{+3}$ | 0.092 |
| CdF$_2$ | 6.64 | Cd$^{+2}$ | 0.103 |
| ZnF$_2$ | 4.95 | Zn$^{+2}$ | 0.083 |
| YbF$_3$ | unknown | Yb$^{+3}$ | 0.100 |
| HfF$_4$ | 4.40 | Hf$^{+4}$ | 0.084 |
| BaF$_2$ | 4.89 | Ba$^{+2}$ | 0.143 |
| GaF$_3$ | 4.47 | Ga$^{+3}$ | 0.062 |

Cadmium fluoride was chosen because it has an ionic radius close to that of zinc, but has a much higher crystalline density. Also, the addition of CdF$_2$ would hopefully counteract the addition of the lower density Group IIIA elements, and it appears that it did because partial substitution of cadmium for zinc seemed to increase the glass forming character of the system, while maintaining a high density. However, glasses with less than 4 mol %, or more than 10 mol %, CdF$_2$ were found to have a greater tendency to crystallize.

Experimental results for this system indicated that higher amounts of BaF$_2$ are good for glass formation. However, it was also found that increasing the concentration of the higher density HfF$_4$ and YbF$_3$ tended to increase the devitrification rate of the glass.

The glasses of the present invention were clear and colorless. They also exhibited a low UV cut-off, as shown in FIG. 1. From this data, it does not appear that the group IIIA element affected the UV cut-off as both glasses have essentially the same UV cut-off wavelength. There is a strong absorption band from ~850–1050 nm due to the rare-earth ion, Yb$^{+3}$. This band does not affect the UV or visible regions of the glass. Tests were done to see if this absorption band could be eliminated by substituting another trivalent ion into the glass, such as yttrium and lanthanum, but these compositions were not glass forming. Attempts were also made to shift the band by using two other rare-earth elements, Cerium and Gadolinium. Other elements, such as Europium, Terbium, Erbium, and Lutetium were not tested. Only heavy metal fluorides were considered in the interest of keeping the density of the glass as high as possible.

Figure 1E:
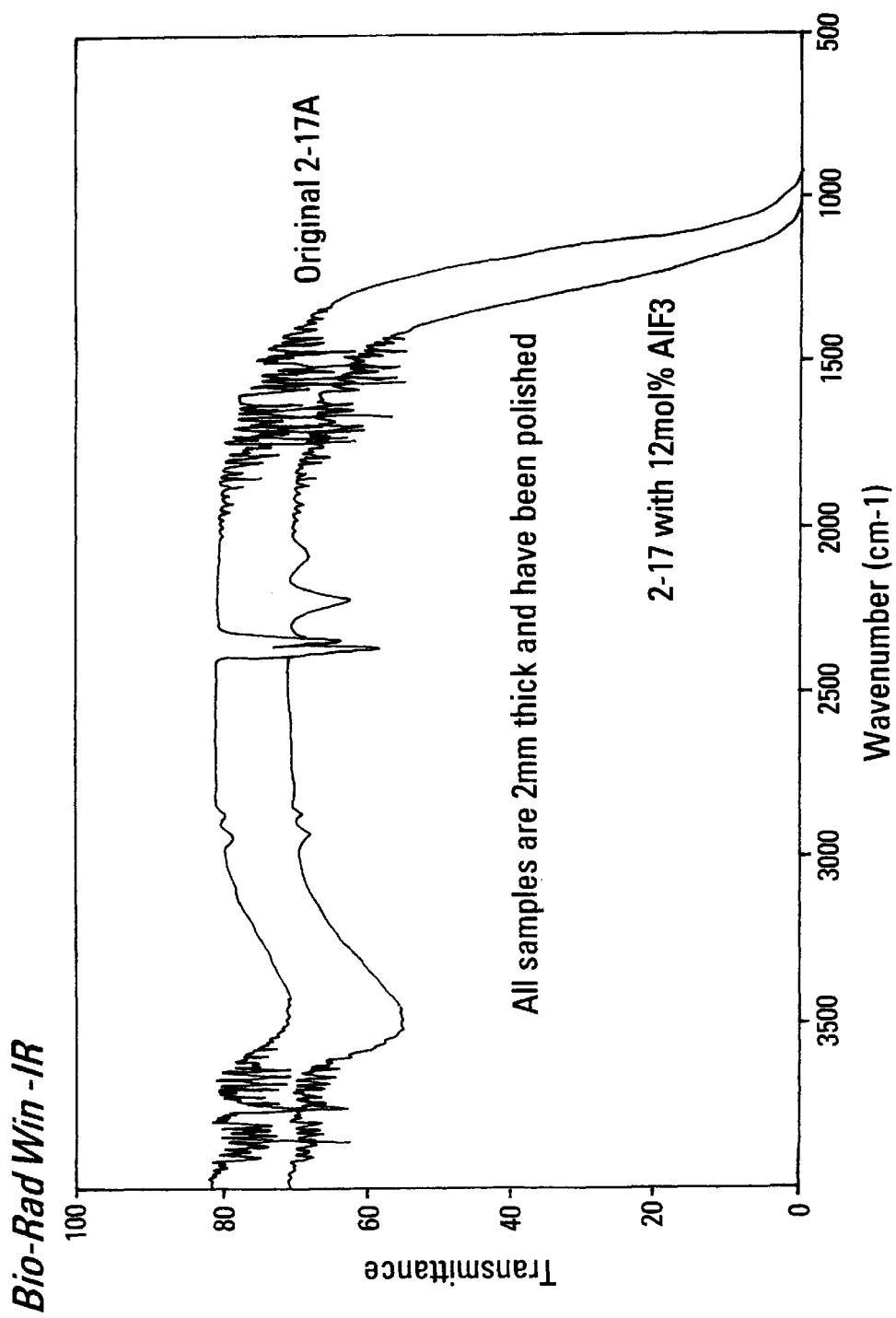
Figure 1F:
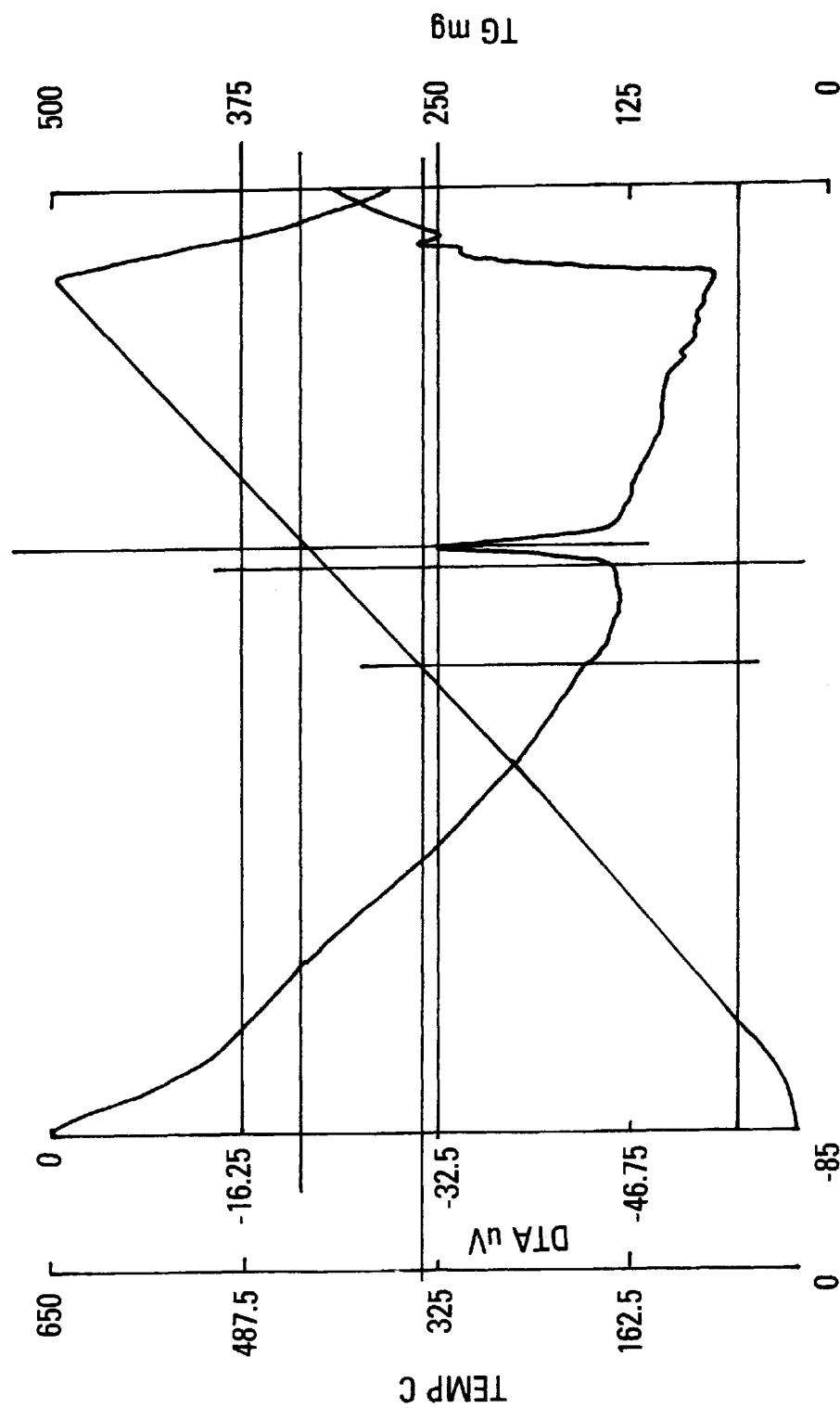
Figure 2:
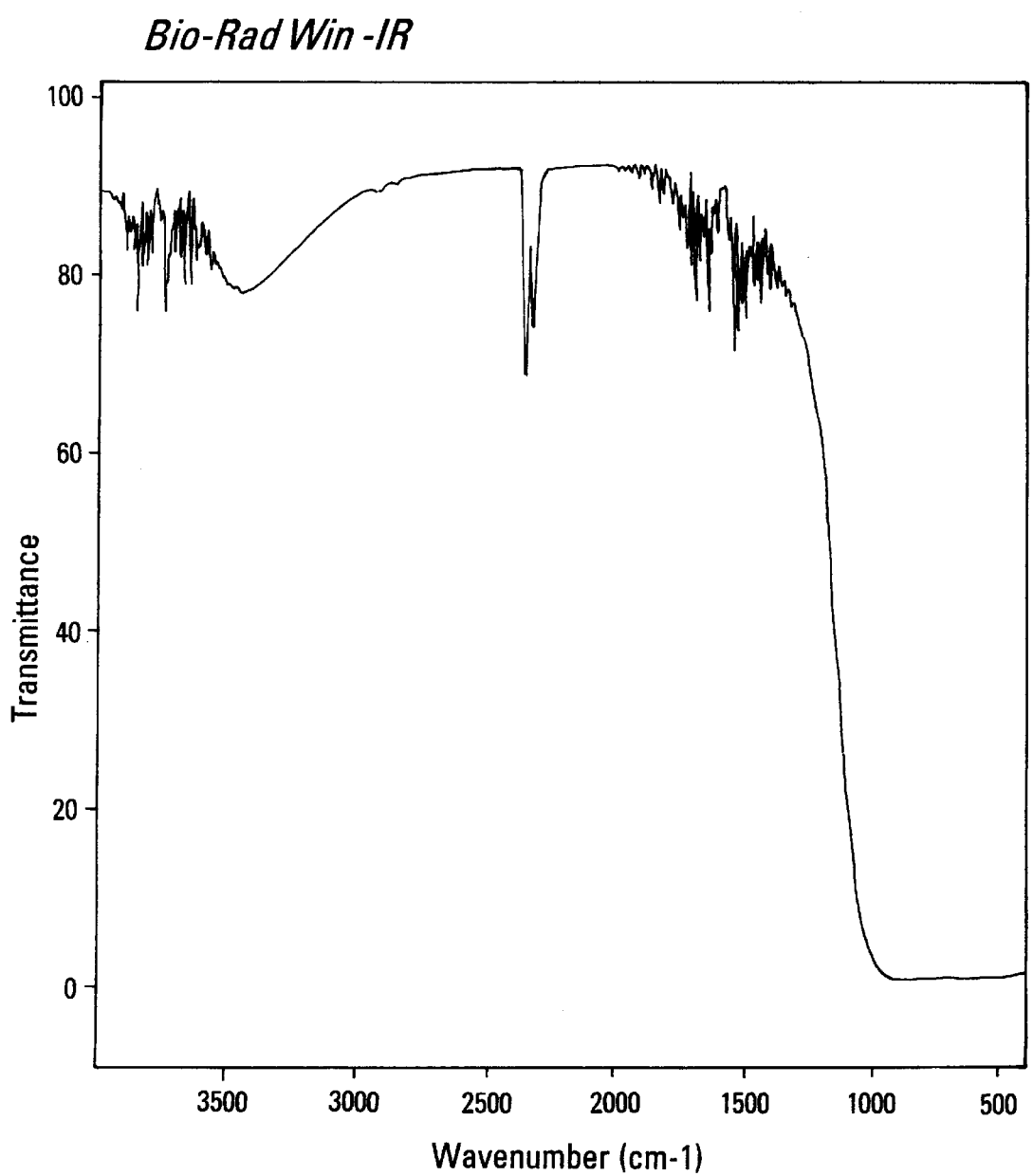
FIG. 2 depicts an additional graph showing comparison test data.
Figure 3:
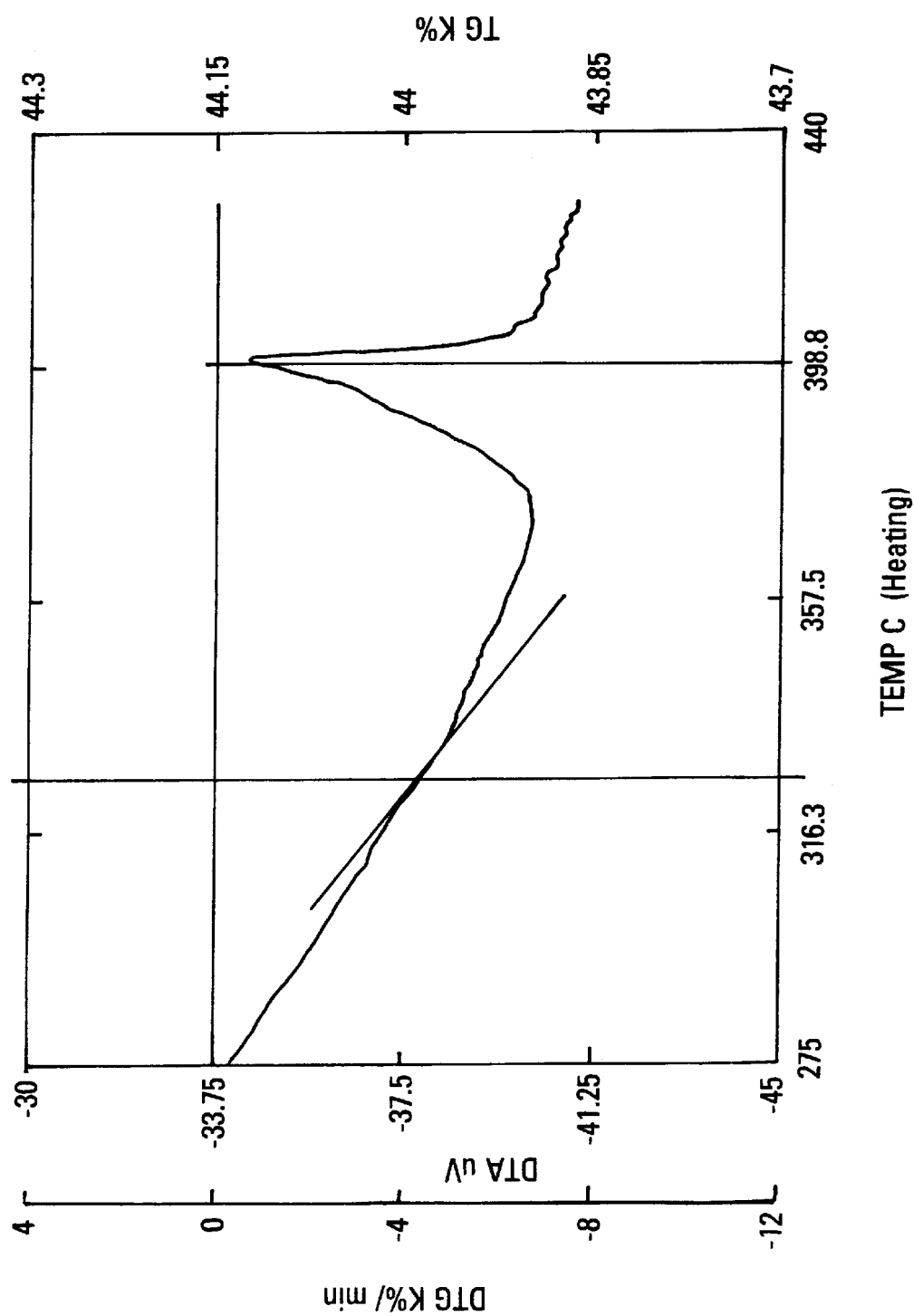
FIG. 3 depicts an additional graph showing comparison test data.
Figure 4:
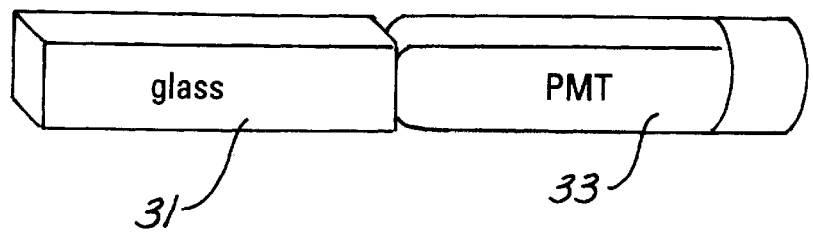
FIG. 4 shows a general configuration for apparatus in accordance with the present invention.
Figure 5:
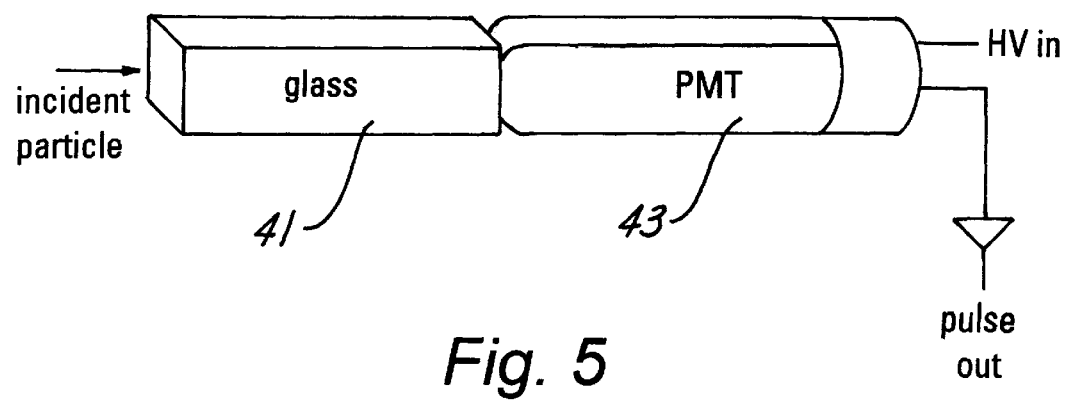
FIG. 5 shows a Cerenkov detector including a heavy metal fluoride glass in accordance with the present invention.
Figure 6:
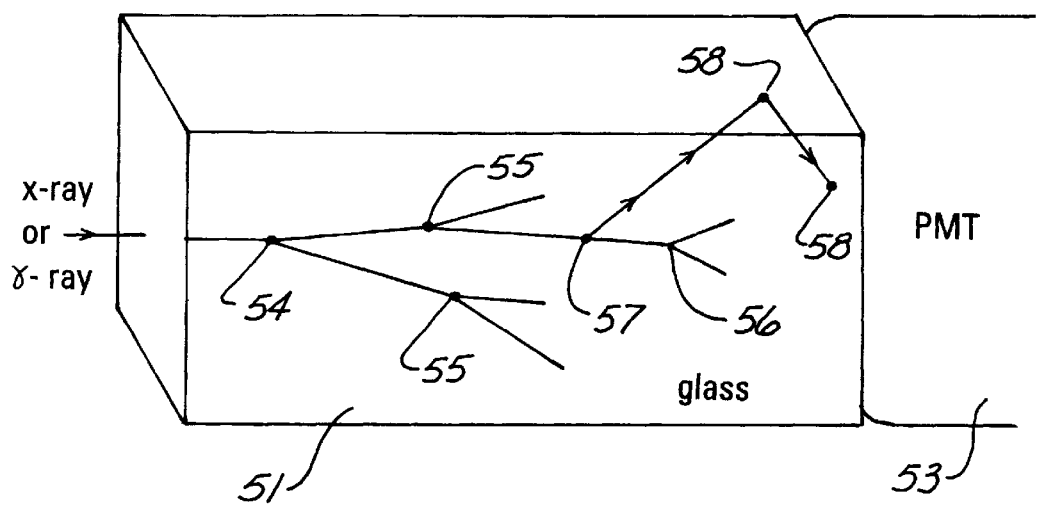
FIG. 6 shows a Cerenkov radiator including a heavy metal fluoride glass in accordance with the present invention.
Figure 7:
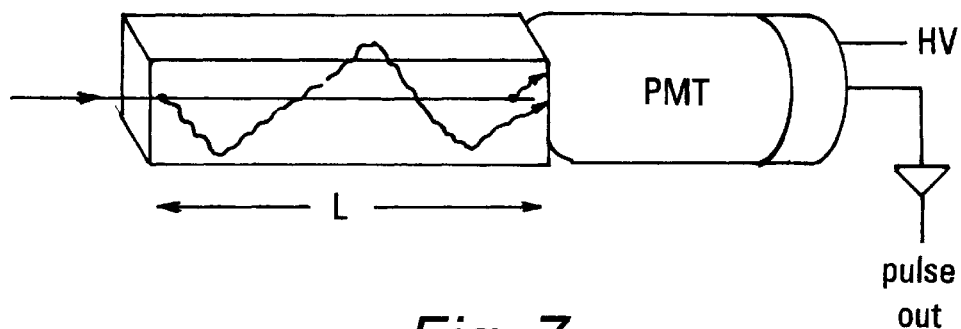
FIG. 7 shows a Cerenkov apparatus for measuring time including a heavy metal fluoride glass in accordance with the present invention.
Figure 8:
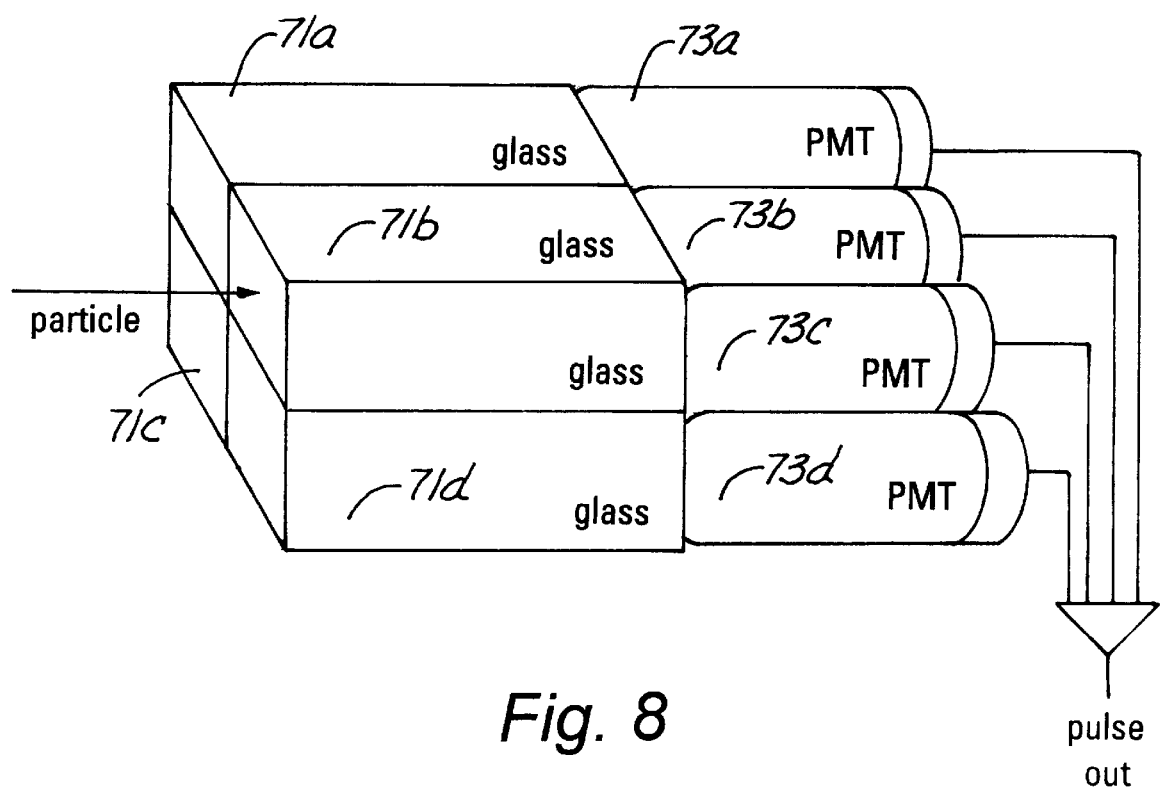
FIG. 8 shows a Cerenkov energy detector including a heavy metal fluoride glass in accordance with the present invention.

The IR cut-off of these glasses is shown in FIG. 1E. As expected, the cut-off of glass I is higher than that of glass II because of the heavier group IIIA elements, In and Ga. The amount of water absorption seen in the samples could be reduced dramatically by preparing the samples in a protective atmosphere such as N$_2$.

Preferably, heavy metal fluoride glasses produced in accordance with the present invention comprise a composition range (in mol percent) selected from the group consisting of:

(16–30)BaF$_2$.(8–26)HfF$_4$.(6–24)InF$_3$/GaF$_3$.(4–16)CdF$_2$. (6–24)YbF$_3$.(4–22)ZnF$_2$; and (16–30)BaF$_2$.(8–26)HfF$_4$.(6–24)InF$_3$/GaF$_3$/AlF$_3$.(0–16) CdF$_2$.(6–24)YbF$_3$.(4–26)ZnF$_2$.

A more preferred heavy metal fluoride glass produced in accordance with the present invention comprises a composition (in mol %) comprising about:

$$26BaF_2.18HfF_4.7InF_3.5GaF_3.10CdF_2.18YbF_3.16ZnF_2 \qquad (I)$$

A more preferred heavy metal fluoride glass produced in accordance with the present invention have a maximum thickness of about most preferably about 3 mm.

Another more preferred heavy metal fluoride glass produced in accordance with the present invention comprises a composition (in mol %) comprising about:

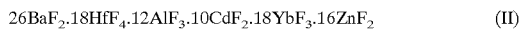

$$26BaF_2 \cdot 18HfF_4 \cdot 12AlF_3 \cdot 10CdF_2 \cdot 18YbF_3 \cdot 16ZnF_2 \quad (II)$$

A more preferred heavy metal fluoride glass produced in accordance with the present invention have a maximum thickness of most preferably greater than about 6 mm.

The heavy metal fluoride glasses produced in accordance with the present invention exhibit the following characteristics:

| CHARACTERISTICS | (II) MORE PREFERRED VALUES | (I) PREFERRED VALUES |
|---|---|---|
| Glass Transition Tg | 338° C. | 326° C. @ heating of 5° C./min |
| Onset of Crystallization Tx | 421° C. | 370° C. |
| Peak of Crystallization Tc | 440° C. | 399° C. |
| Bulk Density (Archimedes) | 5.8g/cc | 6.0g/cc |
| Ultra-violet cut-off | ~268nm | ~260nm |
| Infrared cut-off | ~9μm | ~10μm |

The densities of the glass samples were determined by the Archimedes method. Distilled water was used as the immersing medium. The glass transition temperatures were tested by using a Differential Scanning Calorimeter. The UV/visible transmission spectra were measured by using a UV/VIS/NIR Spectrometer.

The following examples are provided to illustrate the present invention.

EXAMPLE I

The synthesized fluorides are added to the starting fluorides and excess reagent mixture and ground thoroughly. The crucible is then rinsed out with water and dried with high pressure air to ensure that all traces of water are removed. The mixture is then placed in the crucible and the excess fluorinating agent is burned off at about 600° C. for between about 1–1.5 hours. A lid is then placed on top of the crucible and the furnace is turned up to about 900° C. for about thirty minutes. The crucible is then removed from the furnace and kept hot using an appropriate burner. The melt is then quickly poured into a preheated brass mold that was at about 270° C. The mold is then shut off and allowed to cool naturally.

EXAMPLE II

The raw materials used were the same as in Example I. The process was the same as Example I except that the annealing temperature in Example II was different.

The emission of Cerenkov radiation in the UV and visible optical ranges is a well-known property of relativistic particles in transparent media.

The mechanisms of energy loss, multiple scattering and Cerenkov emission of light in materials are known, and these processes were simulated exactly for these examples.

The detection of the Cerenkov photons is simulated with a Burle photomultiplier tube (PMT) C31000M. Two other Burle PMT's were simulated, the C83060 and the C83063E, which were both inferior in performance to C31000M for Cerenkov light in all glass. The transmission of light through samples Example I and Example II was taken from measurements; and transmission through the materials were taken from the measurements described by E. Ramberg, "PbF$_2$ for High-Rate, High Energy Calorimetry," *Calorimetry in High Energy Physics*, eds. D. F. Anderson, Fermilab, Oct. 29–Nov. 1, 1990, the disclosures of which are incorporated in their entirety by reference thereto herein.

PbF$_2$ has been investigated as a Cerenkov detector by the high energy physics community, and SF5 is a newly manufactured and commercially available 'lead-glass' material.

For purposes of these examples, two sources have been simulated: a 0.478 MeV electron (from a backscattered 0.6617 MeV $^{137}$Cs λ-ray) and a minimum-ionizing high energy μ lepton.

The pulse height distributions for incident 0.478 MeV electrons are displayed in FIGS. 1(a–d) for the four comparison materials, (a) Example I, (b) Example II, (c) SF5, and (d) PbF$_2$. The samples simulated were each 1-mm thick, where the average range of these 0.478 MeV electrons is about 0.04 cm. The number of events with zero pulse height is a direct measure of the inefficiency of the e$^-$→sample-→PMT detection chain.

The mean pulse height and the detection efficiency for each material are listed in the following table. The Example 1 glass is superior to all others in performance.

| Energy/Particle | Medium | Pulse Height | Efficiency |
|---|---|---|---|
| 0.478 MeV e$^-$ | Eg. I | 1.80 pe | 82% |
| 0.478 MeV e$^-$ | Eg. II | 1.33 pe | 69% |
| 0.478 MeV e$^-$ | SF5 | 1.12 pe | 65% |
| 0.478 MeV e$^-$ | PbF$_2$ | 1.35 pe | 71% |

The pulse height distributions for incident 1 GeV μ's are displayed below (a–d) for the same materials, (a) Example I, (b) Example II, (c) SF5, and (d) PbF$_2$. This energetic μ passes through the 1-mm samples. The mean pulse height distributions are listed in the following table. The samples all had comparable efficiency.

| Energy/Particle | Medium | Pulse Height |
|---|---|---|
| 1 GeV μ | Eg. I | 11.4 pe |
| 1 GeV μ | Eg. II | 8.9 pe |
| 1 GeV μ | SF5 | 5.0 pe |
| 1 GeV μ | PbF$_2$ | 10.1 pe |

Although not wishing to be bound by any particular theory, the superior performance of the Example I glass is attributed to its superior transmission in the ultra-violet (UV), and the subsequent high efficiency of the Burle photocathode in the UV range.

The present invention has been unexpectedly discovered to result in high density glasses having sufficient stopping power for nuclear particles, and transition down into the ultraviolet range so as to result in a higher flux of light, and, therefore, higher efficiency and higher precision.

Although not wishing to be bound by any particular theory, the foregoing characteristics of the high density glass produced in accordance with the present invention are believed to be important because electromagnetic particles, such as electron and photons, impinging on the high density glass, generate a cascade of particles throughout the volume of the glass. Charged particles with velocities greater than c/n, where c is the velocity of light in vacuum and n is the index of refraction of the glass, will radiate electromagnetic radiation, i.e. Cerenkov radiation, at a rate accordingly to the following formula:

$$\frac{d^2N}{d\lambda dz} = \frac{2\pi\alpha}{\lambda^2}\left[1 - \frac{1}{\beta^2\eta^2(\lambda)}\right]$$

where the index of refraction may be wavelength-dependent and the flux is in units of photons per unit wavelength per unit track length in the glass.

It has also been discovered that the high density glass produced in accordance with the present invention is particularly useful in science and technology as applied to any crystalline material sensitive to the passage of ionizing radiation, including devices to measure time, and devices to measure energy.

Harshaw Chemical, Bicron, Rexon, and similar companies, routinely produce crystalline scintillators and Cerenkov media. The glassy materials of the present invention are intended to function in an advantageous manner in such devices.

As to the measurement of time, Cerenkov light is emitted instantaneously; and, therefore, provides an immediate signal for the presence of a charged particle. For example, in medical applications of positron emission tomography (PET), a positron from a radioactive source annihilates an atomic electron in a sample, resulting in 2 γ-rays having an energy of about 0.511 MeV, which are geometrically back-to-back. Thus, it is necessary to localize impact points of the γ-rays for imaging. Background to the image consists of scattered γ-rays, and γ-rays from other annihilations. These background hits are usually out of time with the correct hit, and can be eliminated by stringent timing conditions on the γ-rays pairs accepted as annihilation events. With Cerenkov radiation, a timing window as small as 5 ns is easily achievable and reduces background from one MHz sources by a factor of 200.

As to devices to measure energy, also referred to as calorimeters in high energy and nuclear physics, photons in the visible, the integral flux is about 300 photons per centimeter of charged particle track linked in the glass. Therefore, the optical flux is proportional to track length, which is proportional to the number of tracks, which is proportional to the incident particle energy. This provides an effective means of high energy electromagnetic particle energy measurement above a few GeV.

A Cerenkov detector comprising glasses I and/or II with characteristics in accordance with the present invention may be optically coupled to a photomultiplier 43 with high quantum efficiency in the UV (ultraviolet) down to about 215 nm. The combination of a Cerenkov radiator with optical transmission and photocathode efficiency down to about 215 nm constitutes a detector of ionization radiation.

The surfaces of the glass are coated with a thin layer of Teflon of aluminized Mylar, of any other reflective material less than about 1 mg/cm². The high optical index of refraction results in total internal reflection of most of the Cerenkov light. The reflective coating reflects most of the remaining light, resulting in a highly efficient light gathering medium.

Although not wishing to be bound to any particular theory, the method of detecting Cerenkov light radiation using glasses of the present invention is believed to be unexpectantly advantageous due at least in part to the fact that the glasses of the present invention are transparent to the bulk of the produced Cerenkov light which travels through the glass to the photocathode of the PMT.

A Cerenkov radiator comprising glasses with characteristics in accordance with the present invention allows efficient generation of optical Cerenkov light and the high density allows efficient spatial absorption of energetic particles incident upon the glass radiator.

54 is a point of primary Compton scatter of photoelectric conversion. 55 is a point of secondary scatter of conversion. 56 is a point of tertiary scatter or conversion. 57 is Cerenkov light emitted form charged particle (in this case, an electron or positron) which has velocity v>c/n where n is the index of refraction and c is the velocity of light. 58 is optical Cerenkov light reflected and captures by a photocathode of the PMT.

The efficiency of the glass of the present invention is advantageous at least in part due to: (i) the high optical index, n, (ii) the higher density of the material, (iii) the higher average atomic number, Z, of the material, and (iv) the net collected Cerenkov light is larger due to the superior transmission of light in the ultraviolet.

A method of radiating Cerenkov light using glasses of the present invention is believed to be unexpectantly advantageous due at least in part to the fact that the glasses of the present invention have characteristics, including: (i) higher density, (ii) higher index of refraction, (iii) higher transmission of the generated Cerenkov light in the ultraviolet (UV) optical range, and (iv) higher average atomic number of the materials of the glass.

A Cerenkov apparatus for measuring time comprises glasses 61 with characteristics in accordance with the present invention, optically coupled to a photomultiplier 63 with high quantum efficiency in the UV (ultraviolet). Since the emission of Cerenkov light is substantially instantaneous along the particle trajectory, and since the particles are relativistic, the emitted light forms a flat disc of light travelling through the Cerenkov radiator. Furthermore, the high density of the radiator necessitates a shorter and more compact radiator.

The time dispersion on Cerenkov photon arrival time at the photocathode of the PMT is about $L/c(n^2-1)$, where L is the length of the glass 61. For L=5 cm, this time dispersion is 0.25 ns, well-matched to the time resolution of a good, fast high-quality PMT.

The method for measuring time in accordance with the present invention using glasses comprising the properties of: (i) higher density, (ii) high optical index, and (iii) high transmission in the UV is believed to be unexpectantly advantageous due at least in part to the fact that the high density results in a more spatially compact material, the high index results in more total internal reflection of the Cerenkov light, and the high transmission in the UV results in more light into the PMT. The luminous light from the glasses of the present invention is recorded by the leading edge of the PMT output pulse, which is more abrupt in time due to these properties.

A Cerenkov energy detector comprising glasses 71a, b, c, d with characteristics in accordance with the present invention, optically coupled to a photomultiplier 73a, b, c, d with high quantum efficiency in the UV (ultraviolet) down to about 215 nm. The total emitted Cerenkov light is proportional to the total pathlength of relativistic particles; and, therefore, a measurement of the intensity of Cerenkov light is a measure of the incident particle energy. The higher density of the Cerenkov radiator improves the quality of the energy measurement over previous detectors since the total particle energy is absorbed in a shorter spatial distance.

All of the incident energy of the particle is converted into newly produced particles which emit Cerenkov light; and, therefore, the total incident energy is proportional to the total Cerenkov light emitted. The peak pulse of the PMT measures the amount of light; and, therefore the energy. The high density of the glasses of the present invention ensure that all of the incident particle's energy is converted into new particles.

The method of energy measurement of the present invention involves copious production of light due to (i) high density, (ii) high index of refraction, and (iii) high transmission in the UV. All three factors allow a measurement of the energy of a particle by measuring the peak pulse height of the PMT pulse.

Heavy metal fluoride glasses in accordance with the present invention are particularly useful in laser fibers.

Heavy metal fluoride glasses in accordance with the present invention are particularly useful in scintillating glass.

Heavy metal fluoride glasses in accordance with the present invention are particularly useful in optical amplifiers.

In addition, the heavy metal fluoride glasses of the present invention are also useful and advantageous in medical imaging systems, x-ray detection systems, laser systems, and optical systems.

The heavy metal fluoride glasses of the present invention are somewhat sensitive to moisture when first cast. A thin film develops on the surface of the glass, but this is easily removed during polishing. Although not wishing to be bound by any particular theory, the purity and quality of these heavy metal fluoride glasses of the present invention may be improved by making these heavy metal fluoride glasses in a glove box under a protective atmosphere free of oxygen and water.

Some of the heavy metal fluoride glasses are a bit irregular in shape. The small, white pieces found in some of the specimens are believed to be traces of unmelted powder.

Notwithstanding irregularity in shape and unmelted powder in some of the glasses, this was still a good glass forming composition as evidenced by the absence of crystallization in the samples.

The numbers which appear in brackets refer to the references listed in the section of this application entitled Background Art; the disclosure of such references in their entireties being incorporated by reference thereto herein.

Having thereby described the subject matter of the present invention, it should be apparent that many substitutions, modification and variations of the invention are possible in light of the above teachings. It is, therefore, to be understood that the invention is taught and described here and is only to be limited to the extent of breadth and scope of amended claims.

What is claimed:

1. A high-density glass, comprising heavy metal fluoride glass comprising a composition range (in mol percent): (16–30)$BaF_2$; (8–26)$HfF_4$; (6–24) of (0–24)$InF_3$, (0–24)$GaF_3$ and (0–19)$AlF_3$; (1–16)$CdF_2$; (6–24)$YbF_3$; and (4–26)$ZnF_2$.

2. The high density glass of claim 1, comprising a composition comprising about 26 $BaF_2$; 18 $HfF_4$; 7 $InF_3$; 5$GaF_3$; 10$CdF_2$; 18$YbF_3$; and 16$ZnF_2$.

3. The high density glass of claim 1, comprising a composition comprising about 26 $BaF_2$; 18 $HfF_4$; 12$AlF_3$; 10$CdF_2$; 18$YbF_3$; and 16$ZnF_2$.

4. A process for producing the high density glass according to claim 1, said process comprising:
   (a) converting materials into fluorides in amounts sufficient to form said glass;
   (b) melting said fluorides at a melt temperature for a time sufficient to produce a melt;
   (c) quenching said melt to produce a quenched melt; and
   (d) subjecting the quenched melt to an annealing temperature for a time sufficient to anneal the resultant glass.

5. The process of claim 4, wherein said materials are selected from the group consisting of metal oxides, hydroxides, and carbonates capable of being converted to fluorides.

6. The process of claim 5, wherein said melt temperature is about 800° C.

7. The process of claim 6, wherein said melt time is within the range of about 10 minutes to about 60 minutes.

8. The process of claim 4, wherein said annealing temperature is a temperature less than the glass transition temperature of the glass.

9. The process of claim 4, wherein said resultant glass comprises a composition comprising about 26 $BaF_2$; 18 $HfF_4$; 7 $InF_3$; 5$GaF_3$; 10$CdF_2$; 18$YbF_3$; and 16$ZnF_2$.

10. The process of claim 4, wherein said resultant glass comprises a composition comprising about 26 $BaF_2$; 18 $HfF_4$; 12$AlF_3$; 10$CdF_2$; 18$YbF_3$; and 16$ZnF_2$.

* * * * *